United States Patent
Hasegawa et al.

(10) Patent No.: US 6,473,136 B1
(45) Date of Patent: Oct. 29, 2002

(54) TELEVISION BROADCAST TRANSMITTER/RECEIVER AND METHOD OF TRANSMITTING/RECEIVING A TELEVISION BROADCAST

(75) Inventors: Takashi Hasegawa, Hachioji; Yoshito Nejime, Koganei, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/456,299

(22) Filed: Dec. 8, 1999

(30) Foreign Application Priority Data

Dec. 11, 1998 (JP) .......................................... 10-352254

(51) Int. Cl.[7] ............................. H04N 9/74; H04N 5/40; H04N 7/00
(52) U.S. Cl. ........................ 348/723; 348/724; 348/722; 348/584; 348/589; 348/578; 348/600; 386/45; 386/46; 725/36; 725/67
(58) Field of Search ............................... 348/722, 723, 348/578, 584, 589, 598, 600, 469, 724; 725/36, 62–63, 67, 145; 386/46, 83, 45, 125, 126

(56) References Cited

U.S. PATENT DOCUMENTS

| | | | | |
|---|---|---|---|---|
| 4,393,394 A | * | 7/1983 | McCoy | 358/22 |
| 5,493,638 A | | 2/1996 | Hopper et al. | |
| 5,592,228 A | * | 1/1997 | Dachiku et al. | 348/416 |
| 5,659,877 A | * | 8/1997 | Enomoto et al. | 455/4.1 |
| 5,861,905 A | * | 1/1999 | Brummett | 348/6 |
| 5,956,629 A | * | 9/1999 | Morrison | 455/166.2 |
| 5,991,453 A | * | 11/1999 | Kweon et al. | 382/250 |
| 6,031,575 A | | 2/2000 | Suzuki et al. | |
| 6,034,740 A | * | 3/2000 | Mitsui et al. | 348/587 |
| 6,075,551 A | * | 6/2000 | Berezowski et al. | 348/9 |
| 6,147,704 A | * | 11/2000 | Ito et al. | 348/222 |
| 6,233,278 B1 | * | 5/2001 | Dieterich | 375/240.03 |
| 6,268,864 B1 | * | 7/2001 | Chen et al. | 345/428 |
| 6,271,890 B1 | * | 8/2001 | Tamir et al. | 348/587 |
| 6,278,466 B1 | * | 8/2001 | Chen | 345/473 |

FOREIGN PATENT DOCUMENTS

| | | |
|---|---|---|
| EP | 0660609 | 6/1995 |
| EP | 0933727 | 8/1999 |
| JP | 9322163 | 12/1997 |

OTHER PUBLICATIONS

Y. Kidani, et al, Video Communication System Using Portrait Animation, 1999 Proceedings, IEEE, pp. 309–314.

M. Reinder, et al, Facial Feature Localization and Adaptation of a Generic Face Model for Model–based Coding, Signal Processing: Image Communication 7 (1995) 57–74.

D. Thalmann et al, Sharing VLNET Worlds on the Web, Computer Networks and ISDN Systems 29, (1997), pp. 1601–1610.

\* cited by examiner

Primary Examiner—John Miller
Assistant Examiner—Paulos M. Natnael
(74) Attorney, Agent, or Firm—Antonelli, Terry, Stout & Kraus, LLP

(57) ABSTRACT

Motion information for an object and background information are broadcast-transmitted on a transmitting side. On a receiving side, the motion information and the background information are received, and one of a plurality of character models previously stored is selected. A character image is generated using the selected mode and the received motion information. The character image and the received background image are synthesized and displayed on one screen. The viewer can select a character of his or her own liking, and can view the broadcast-transmitted program as a program in which the particular character appears.

16 Claims, 5 Drawing Sheets

TELEVISION BROADCAST TRANSMITTER/RECEIVER AND METHOD OF TRANSMITTING/RECEIVING A TELEVISION BROADCAST

BACKGROUND OF THE INVENTION

The present invention relates to a broadcast transmission method and apparatus for supplying images and data through a broadcast network, a method of receiving the broadcast and a broadcast receiving apparatus such as a personal computer, a set-top box, an intelligent television receiver and a digital broadcast receiver capable of processing the broadcast data and images.

In the conventional broadcast transmission system, the viewers can view only the video and audio information predetermined as a program.

In recent years, an attempt has been made to generate and transmit by measuring the motion and the facial expression of the human being and broadcast, in real time, a computer graphics character (hereinafter referred to simply as a CG character) based on the particular data ("Real-Time Animation of the Upper Half of the Body Using a Facial Expression Tracker and an Articulated Input Device", Graphics and CAD Research Group Report 81–8, Information Processing Society of Japan, Dec. 19, 1996). In this system, however, the CG characters are generated and the resulting images are broadcast by the broadcast station, and therefore as in the conventional broadcast system, only the video and audio information predetermined as a program can be viewed. On the other hand, JP-A-6-327835 (laid open Nov. 29, 1994) discloses a communication game apparatus for playing a network game using characters preferred by the user.

SUMMARY OF THE INVENTION

An object of the present invention is to provide a method and an apparatus for enabling the viewers to select a character of his or her liking and view a broadcast-transmitted program as a program participated in by the related character.

According to one aspect of the invention, there is provided a broadcast-transmitting system, wherein data of expression (or a lock) and motion of a character is broadcast-transmitted as broadcast data together with image information so that a CG character selected by a viewer is generated and displayed on the receiving apparatus.

In view of the fact that the data on the expression and motion of the character are broadcast-transmitted together with the image information as broadcast data and the CG character selected by the viewer is generated and displayed on the receiving apparatus, the program broadcast-transmitted can be viewed as a program in which the character preferred and selected by the viewer appears. In this invention. the wording "to broadcast-transmit" means transmission of a program through a communication medium such as radio wave or internet for public reception.

According to another aspect of the invention, there is provided a broadcast-transmitting system comprising a first generator for generating a background image, a first transmitter for converting the background image into a first transmission signal, a second generator for generating motion information for an object moving on the image, a second transmitter for converting the motion information into a second transmission signal, and a device for broadcast-transmitting the first and second transmission signals.

According to still another aspect of the invention, there is provided a broadcast-receiving system comprising a receiving apparatus for receiving a broadcast-transmitted background image and motion information for an object moving on the image, a recording medium unit for holding model information for the object, and an information processing unit coupled to the receiving apparatus and the recording medium unit and having functions of enabling a model defined by the model information read from the recording medium unit to perform motion based on the motion information reproduced by the receiving apparatus and permitting the model in motion, i.e., a character image and the background image reproduced by the receiving apparatus to be displayed on one and the same screen.

According to yet another aspect of the invention, there is provided a broadcast transmitting/receiving method, comprising the steps of:

broadcast-transmitting background image information and motion information for an object on a transmitting side;

receiving the broadcast-transmitted background information and the motion information on a receiving side;

selecting information of at least one character model from a recording medium holding information of a plurality of character models for an object on the receiving side;

generating a character model using the information of the selected character model and generating a motion-performing character image from the character model using the received motion information on the receiving side; and displaying the generated character and the received background image on one and the same screen at the same time on the receiving side.

DETAILED DESCRIPTION OF EMBODIMENTS

Figure 1:
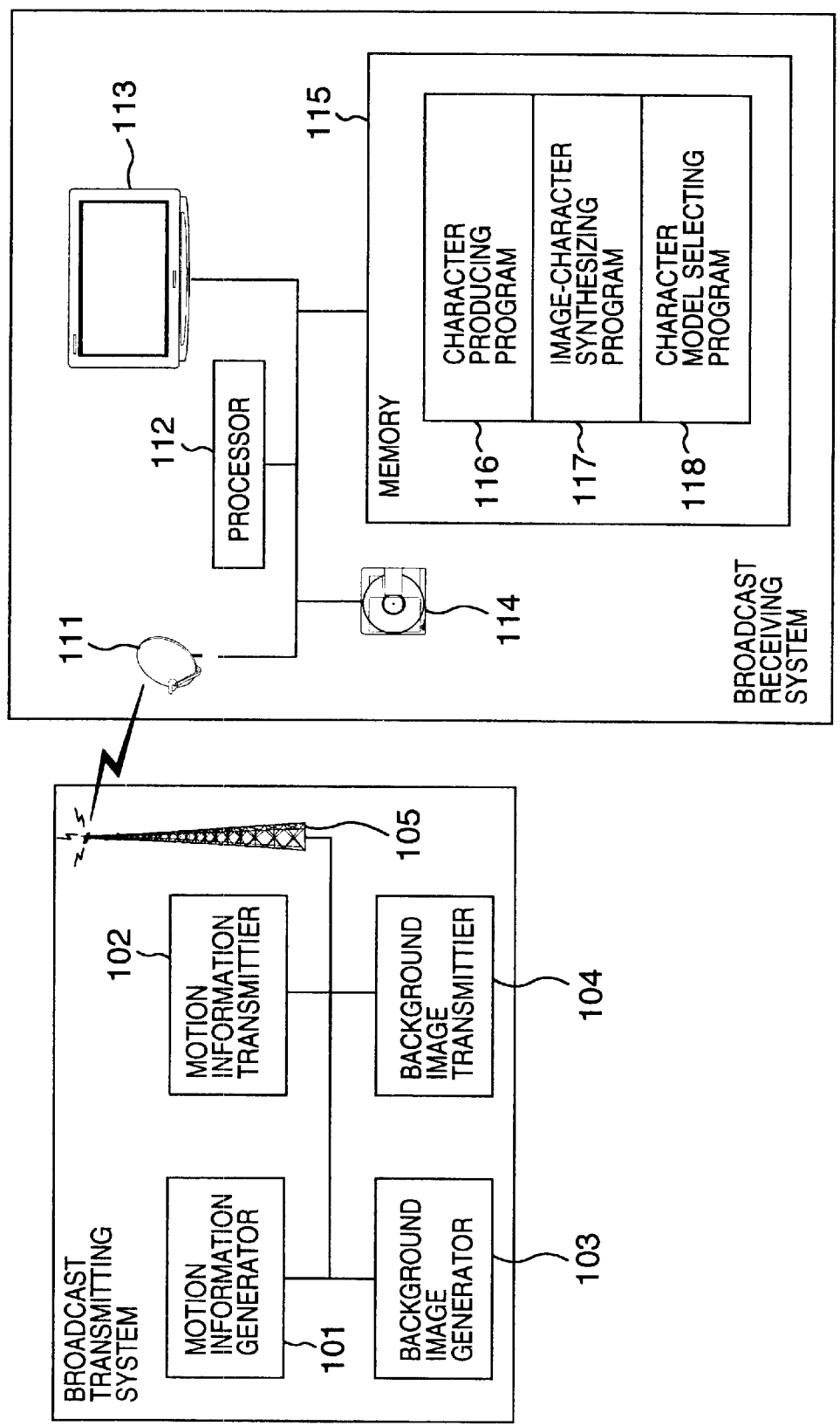
FIG. 1 is a diagram showing a broadcast transmission/receiving system according to an embodiment of the present invention.
Figure 2:
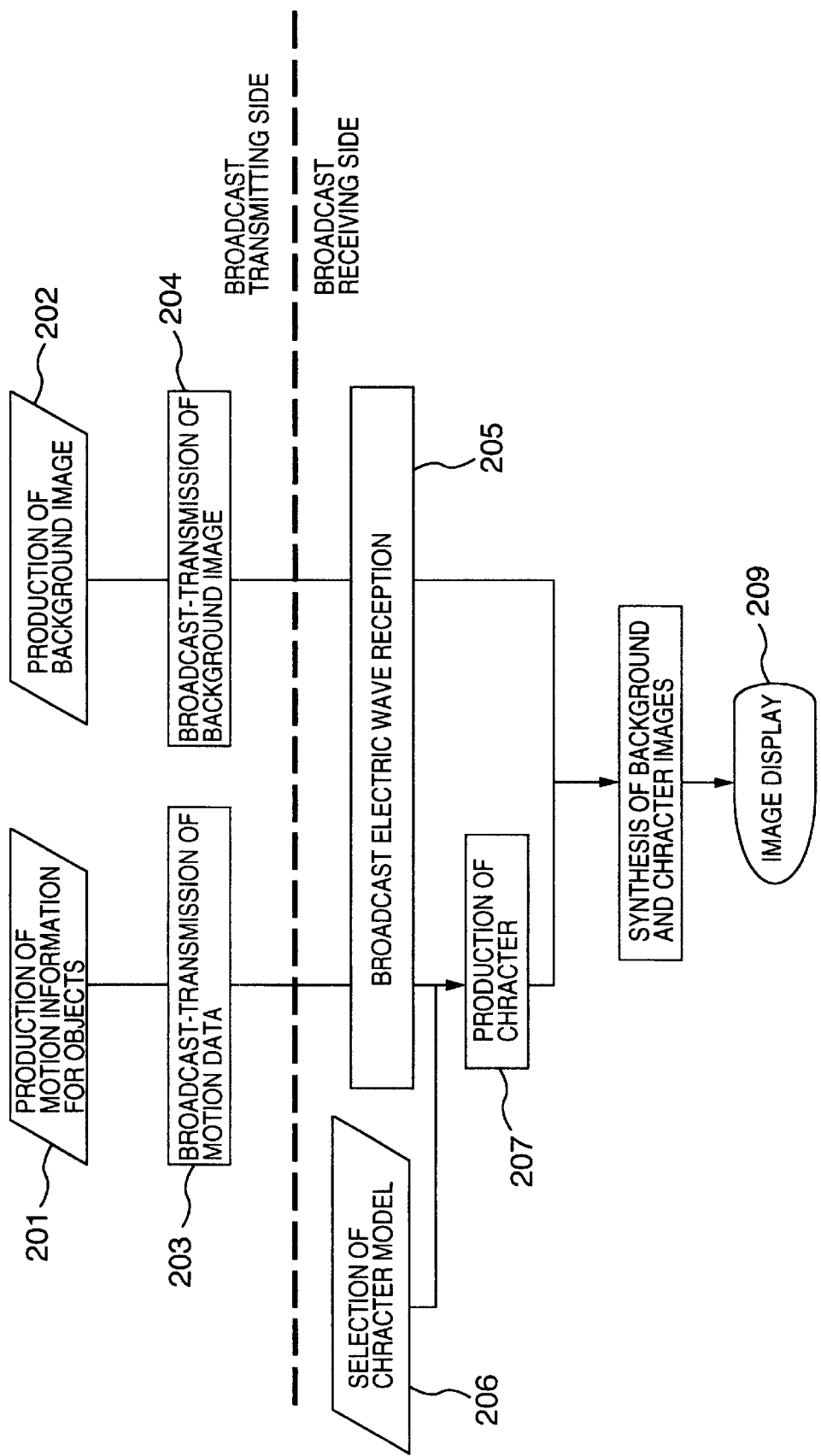
FIG. 2 is a diagram showing a broadcast transmission/receiving method according to an embodiment of the invention.

A broadcast transmission/receiving system and a broadcast transmission/receiving method according to an embodiment of the invention will be described with reference to FIGS. 1 and 2.

In a broadcast-transmitting system, motion information for an object moving on a background image is generated (step 201) using a motion information generator 101. This information is converted into broadcast data (transmission signal) and is transmitted (distributed) (step 203) from a transmission antenna 105 using a motion information transmitter 102. At the same time, the background image generated in a background image generator 103 is converted as required into a transmission signal of a different frequency from the data broadcast frequency using a background image transmitter 104 and broadcast-transmitted (distributed) (step 204) as a transmission signal from the antenna 105. According to this embodiment, the background image generator is a TV camera for inputting the image of a town (step 202). Nevertheless, a background may be synthesized using the computer graphics (hereinafter referred to as CG) technique. On the other hand, the motion information may be inserted as broadcast data in the vertical flyback period of the background image signal and broadcast-transmitted with one frequency.

In the broadcast-receiving system, a removable medium (recording medium) unit 114 such as a CD-ROM or a DVD-ROM connected to the receiving apparatus 113 has stored therein a plurality of character models selected in accordance with the objects for which the motion information is transmitted. The user executes a character model select program 118 existing on a memory 115 coupled to an information processing unit, i.e. a processor 112 coupled to the receiving apparatus 113 and the removable unit, and thus selects a character model of his or her liking in advance (step 206). The image information and the motion information broadcast-transmitted (distributed) is received by the receiving antenna 111 (step 205). Then, using the processor 112, the character generating program 116 existing on the memory 115 is executed. Thus, a character image is generated (step 207) from the selected character model existing on the removable medium 114 and the received character motion information. In the last step, an image-character synthesis program 117 existing on the memory 115 is executed using the processor 112, so that the received background image is synthesized (step 208) with an image to be displayed from the character image generated in the character generating step 207 and displayed on an image display unit 113 such as a TV (step 209). The process of the programs 116, 117 can be executed using the technique described in the literature of the Information Processing Society of Japan quoted above.

The step 201 for generating the motion information for objects on the broadcast-transmitting side and the structure of the motion information will be explained with reference to FIG. 3. The motion of the character according to this embodiment is performed using a two-button mouse. The motion information are transmitted (distributed), for example, at a timing of clicking the mouse included in the broadcast-transmit system. In the case where the right and left buttons of the mouse are clicked at the same time, the mouse coordinate at the time of clicking represents the position of the torso. In the case where only the left button is clicked, on the other hand, the mouse coordinate at the time of clicking represents the position of the left hand, while in the case where only the right button is clicked, the mouse coordinate at the time of clicking represents the position of the right hand. Thus, the data having the structure shown in FIG. 3, for example, is generated by a series of click operations. Numerals 310 to 314 in FIG. 3 designate the data in time series. From left to right, a numeral "1" in column 300 indicates the motion data, a numeral in column 301 indicates the object involved, column 302 indicates an X coordinate and column 303 a Y coordinate. In column 301, numeral 1 designates the left hand, 2 the right hand, and 3 the torso. Thus, numeral 312, for example, is the motion data indicating that the right hand coordinate is (20, 80).

Figure 4:
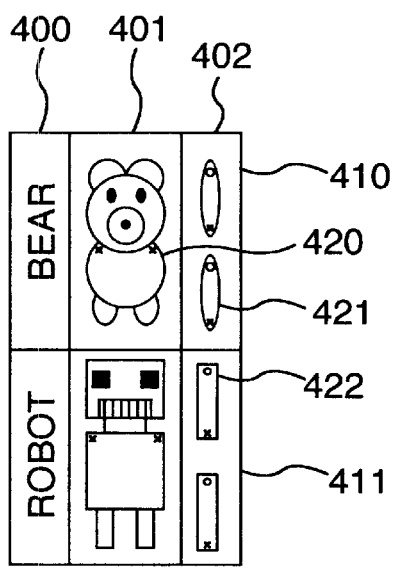
FIG. 4 is a diagram showing an example of a character model according to an embodiment of the invention.

Now, an example of the character model stored in the removable medium unit 114 of the broadcast-receiving system will be described with reference to FIG. 4. In FIG. 4, information on a bear 410 and a robot 411 are stored as character models. These model information are configured with a model name 400, a torso image 401 and a hand image 402. Also, the torso image includes the hand-connected position information (x mark designated by 420). The hand image, on the other hand, includes the torso-connected position information (x mark designated by 421) and the information (o mark designated by 422) indicating the position reflecting the motion information coordinate.

Figure 5:
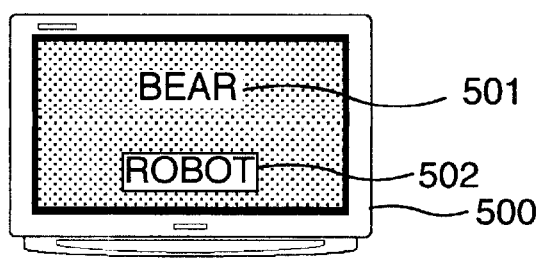
FIG. 5 is a diagram showing an example of the user interface for selecting a character model according to an embodiment of the invention.

Now, an example of method (step 206) for selecting a character model on the broadcast-receiving side will be explained with reference to FIG. 5. With the activation of the character model select program 118, the names 400 of the character models held in the removable medium unit 114 are listed as designated by 501, 502 on the image display screen 500 of the receiving apparatus. One of the models is selected out of these names using a remote controller. In the case of FIG. 5, the robot 502 is selected.

Figures 6A, 6B:
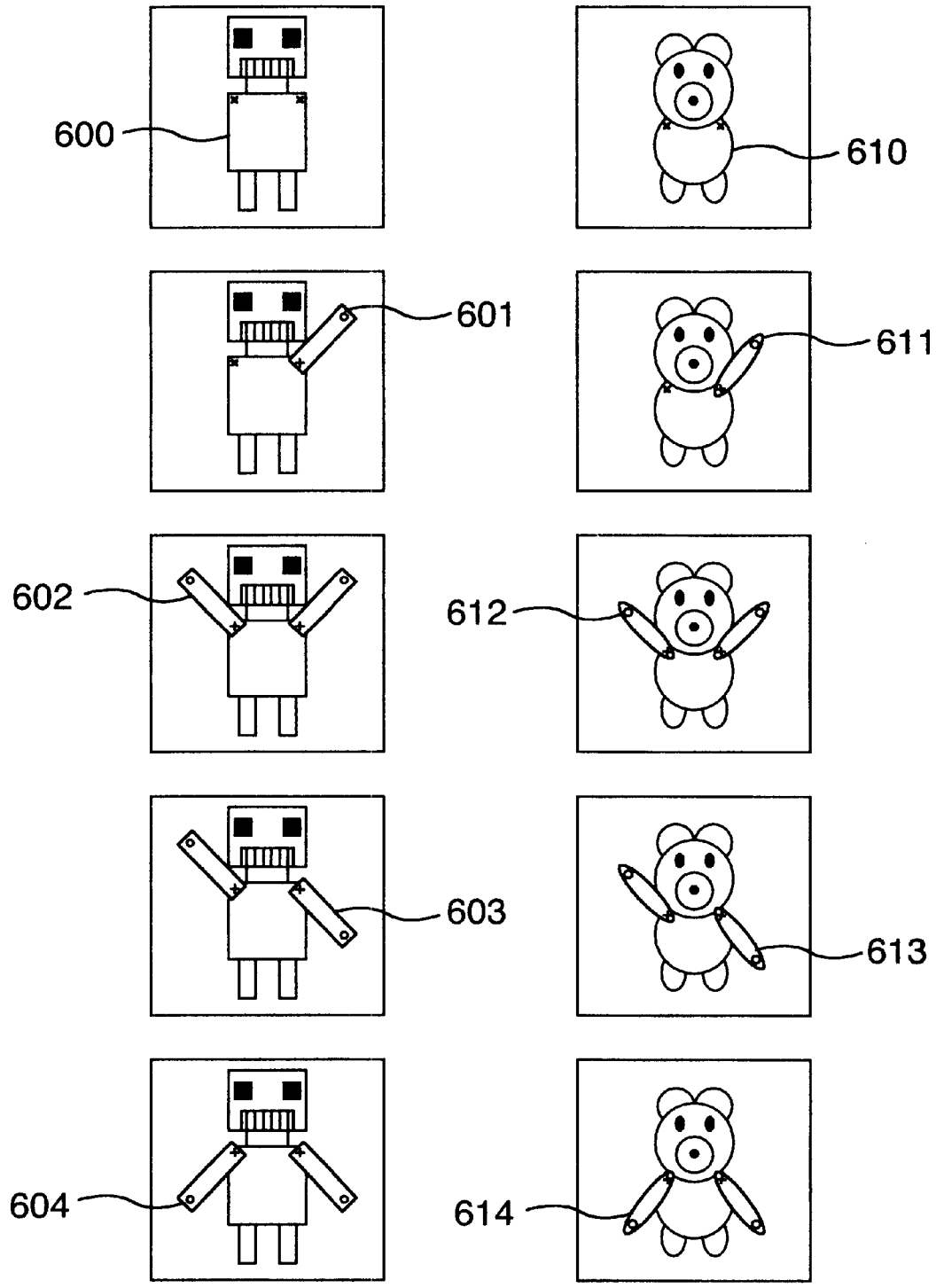
FIGS. 6a and 6b are diagrams showing, in chronological order, an example of the character image generated by the character generating means according to an embodiment of the invention.

Then, a method (step 207) for generating a character on the broadcast-receiving side will be explained with reference to FIGS. 3 and 6. Assume that the character generation program 115 is activated and as shown in FIG. 5, the robot is selected as a character model. As shown in FIG. 6a, character images 620 are generated. Assume that the image size is 100 pixels by 100 pixels. First, upon receipt of the motion information 310 shown in FIG. 3, the torso is plotted (600) at the coordinate (50, 50). When the motion information 311 shown in FIG. 3 is received, the left hand is plotted (601) by locating the left hand connecting point (marked x) at the connecting point (marked x) on the left side of the torso in such a manner that the portion (marked o) reflecting the motion information coordinate coincides with the receive coordinate (80, 80). Then, upon receipt of the motion information 312 shown in FIG. 3, the right hand is plotted (602) in similar fashion. When the motion information 313 shown in FIG. 3 is received, the left hand moves (603) so that the point marked with o assumes the coordinate (80, 20). Then, upon receipt of the motion information 314, the right hand moves (604) so that the point marked with o assumes the coordinate (20, 20). In similar manner, in the case where the bear is selected, the character images 621 are generated as indicated by 610 to 614 in FIG. 6b.

A method (step 208) for synthesizing the background and characters on the broadcast-receiving side will be explained with reference to FIG. 7. First, the image-character synthesis program 117 is activated, the received background image is plotted (700), and then the character image (620) of the robot generated in the character generating step 207 is plotted so that an image designated by 701 is produced by synthesis. In the process, if the bear is selected as a character, the character image (621) of the bear generated in the character generating step 207 is plotted and the image is synthesized as shown by 702.

In the manner described above, the objects appearing in the same program can be viewed as different images 701, 702 according to the character model selected by the user.

According to this embodiment, the character models are held in the removable medium unit 114 in advance. As an alternative, in the first stage of or before the program start, the character model information shown in FIG. 4 can be broadcast-transmitted (or distributed) as broadcast data. In such a case, the received character models are held in the memory 115.

Figure 7A:
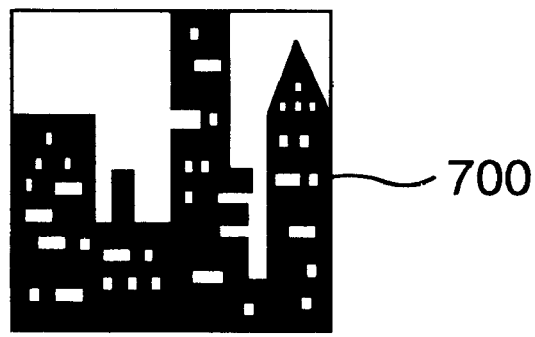
FIGS. 7a to 7c are diagrams showing an example of synthesizing the background image and a character image according to an embodiment of the invention.
Figure 7B:
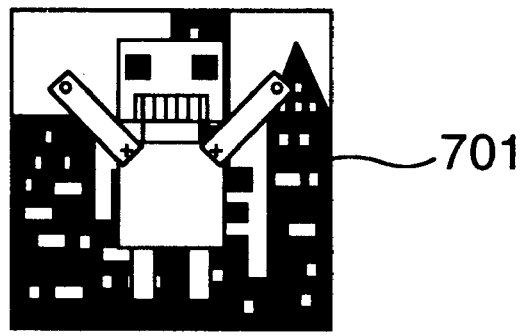
Figure 7C:
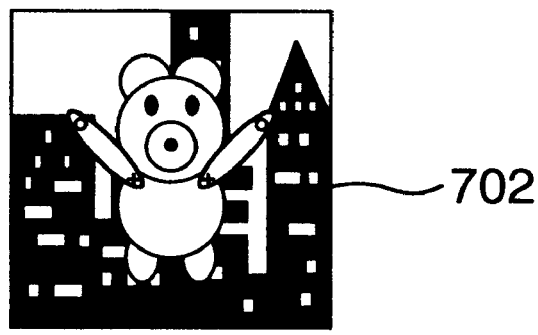
Figure 8:
FIG. 8 is a diagram showing an example of the default character image included in the background image according to an embodiment of the invention.

Also, an auxiliary object which is sufficiently small or thin to be covered by the image of all the character models selectable on the broadcast-receiving side can be included in the background image transmitted from the broadcast-transmitting side as a default character. In this way, the program can be viewed as a normal one also with the broadcast-receiving reproduction apparatus such as a normal TV having no configuration of FIG. 1. An example of this background image is shown in FIG. 8. The default character is completely covered by the character image in the background/character synthesis process as shown in FIGS. 7a to 7c.

Figure 3:
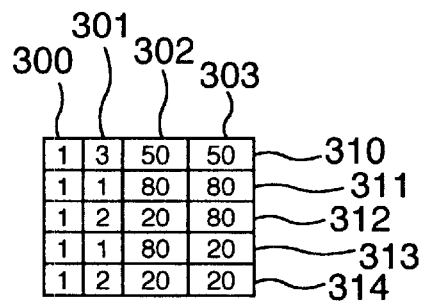
FIG. 3 is a diagram showing an example of the motion information of a character according to an embodiment of the invention.

Audio data of all the voices can be stored with each character model shown in FIG. 4 in the removable medium unit, and the speech information can be transmitted as the broadcast data in addition to the information shown in FIG. 3. In this way, a program is generated which speaks in a voice unique to the selected character. In this case, in a data structure similar to the one shown in FIG. 3, "2" indicating the voice is prepared in column 300 and one kana character indicating the word generated is prepared in column 301, both of which are transmitted in accordance with the pronounce timing. No data are prepared in columns 302, 303.

In similar fashion, effect sounds including footsteps and cries can be stored with each character model, and in accordance with the timing of the pronouncement thereof, the information indicating the type of the effect sound can be distributed as data broadcast in addition to the information shown in FIG. 3. Thus, the effect sound unique to the selected character can be pronounced. In this case, "3" indicating the voice data is prepared in column 300, and a numeral indicating the effect sound ("1" for footsteps, and "2" for cries, for example) is prepared in column 301 and transmitted as information.

In the case of the broadcast using a system capable of encoding the contents such as MPEG-4, on the other hand, the default character as shown in FIG. 8 is encoded as contents different from the background image. Thus, the normal receive-reproduction apparatus synthesizes the default character. In the receive-reproduction apparatus of the configuration shown in FIG. 1, on the other hand, the character generated in the character generating step 207 can be synthesized. In such a case, the default character can be of an arbitrary size and thickness.

Contrary to the embodiment described above, the character models are transmitted as data broadcast, and the motion information is input by the mouse or the like in the broadcast-receiving system. In this way, the character is generated (step 207) and the background/character synthesis is executed (step 208), thereby making it possible to construct a program in which the viewer can move the characters appearing therein.

According to the embodiments described above, the expression and motion data of the characters are broadcast-transmitted (distributed) together with the video information as broadcast data, so that the CG character selected by the viewer is generated and displayed on the broadcast-receiving side. Thus, the broadcast program can be viewed as a program in which the favorite character selected by the viewer appears.

What is claimed is:

1. A broadcast-transmitting system comprising:
   a first generator for generating a background image;
   a first transmitter for converting said background image into a first transmission signal;
   a second generator for generating motion information for an object moving on said image;
   a second transmitter for converting said motion information into a second transmission signal;
   a device for broadcast-transmitting said first and second transmission signals; and
   means for generating information of a model for said object and converting model information into a third transmission signal,
      wherein said third transmission signal is transmitted by the broadcast-transmitting device.

2. A broadcast-transmitting system comprising:
   a first generator for generating a background image;
   a first transmitter for converting said background image into a first transmission signal;
   a second generator for generating motion information for an object moving on said image;
   a second transmitter for converting said motion information into a second transmission signal; and
   a device for broadcast-transmitting said first and second transmission signals,
      wherein said background image broadcast-transmitted includes an auxiliary object having a display size covered behind an image displayed by character model information selectable on a receiving side.

3. A broadcast-receiving system comprising:
   a receiving unit for receiving a broadcast-transmitted background image and motion information for an object moving on said image;
   a recording medium unit for holding model information for said object; and
   an information processing unit coupled to said receiving unit and said recording medium unit and having functions of enabling a model defined by model information read from said recording medium unit to perform a motion based on the motion information reproduced by said receiving unit and also enabling the model in said motion,
   wherein a character image is displayed together with the background image reproduced by said receiving unit on a same screen at the same time.

4. A broadcast-receiving system according to claim 3, wherein said recording medium unit holds a plurality of model information each being selectable under control of said information processing unit.

5. A broadcast-receiving system comprising:
   a receiving unit for receiving a background image broadcast-transmitted and motion information for an object moving on said image;
   a removable medium unit for holding information of a plurality of character models for said object; and
   a processor coupled to said receiving unit and said removable medium,
      wherein said processor includes means for selecting information of a character model for said object from said removable medium, means for generating said character model using the selected character model information, means for generating a character image by activating said character model using the motion information received by said receiving unit, and means for displaying said generated character image and said background image received by said receiving unit on a same screen at the same time.

6. A broadcast-receiving system according to claim 5, wherein speech information of the model for said object is broadcast-transmitted in addition to said background image and said motion information, and said receiving unit receives said speech information together with said background image and the motion information broadcast-transmitted;

said receiving system further comprises a memory coupled to said processor for holding a set of speech segments for said character model; and said processor generates and outputs voice for the character image of the character model selected for said object from said set of speech segments held in said memory using the received speech information.

7. A broadcast-receiving system according to claim 5, wherein information indicating timing of pronouncing effect sound related to said object is broadcast-transmitted in addition to said background image and said motion information, and said receiving unit receives the information indicating said timing of pronouncing together with said broadcast-transmitted background image and the motion information;

said receiving system further comprises a memory coupled to said processor for holding the effect sound related to the character image of said character model; and said processor generates and outputs effect sound related to the character image of the character model selected for said object from the effect sound related to the character image of said character model held in said memory, using said received information indicating the timing of pronouncing.

8. A removable medium for holding a plurality of types of models for an object to be used for the broadcast-receiving system according to claim 5.

9. A method of transmitting/receiving a broadcast, comprising the steps of:

broadcast-transmitting a background image and motion information for an object on a transmitting side;

receiving said broadcast-transmitted background image and said motion information on a receiving side;

selecting information of at least one character model from a recording medium holding the information of a plurality of character models for said object on the receiving side;

generating a character model using said selected information of the character model and generating a character image for performing a motion from said character model using said received motion information on the receiving side; and displaying said generated character image and said received background image on a same screen at the same time on the receiving side.

10. A method of transmitting/receiving a broadcast according to claim 9, wherein information of the model for said object is transmitted in addition to said background image and said motion information on said transmitting side.

11. A method off transmitting/receiving a broadcast according to claim 9, wherein said background image broadcast-transmitted on the transmitting side includes an auxiliary object having a display size covered behind an image displayed by the information of the character model selectable on the receiving side.

12. A method of transmitting/receiving a broadcast according to claim 9, further comprising the steps of:

transmitting speech information of a model for said object in addition to said background image and said motion information on said transmitting side;

receiving said speech information together with said broadcast-transmitted background image and said motion information on said receiving side; and generating and outputting voice for the character image of the character model selected for said object, using the speech information on the receiving side.

13. A method of transmitting/receiving a broadcast according to claim 9, further comprising the steps of:

broadcast-transmitting information indicating the timing of pronouncing effect sound related to said object in addition to said background image and said motion information on said transmitting side;

receiving the information indicating said timing of pronouncing together with said broadcast-transmitted background image and said motion information on said receiving side; and generating and outputting the effect sound related to the character image of the character model selected for said object, using said received information indicating the timing of pronouncing on said receiving side.

14. A method of transmitting/receiving a broadcast according to claim 9, further comprising the steps of:

broadcast-transmitting contents of said background image and contents of the image information of said object separately from the background image contents as image information on said transmitting side; and receiving said broadcast-transmitted background image and the object image on said receiving side, and displaying said object image and said background image on the same screen at a same time in a case where the character image cannot be generated using the motion information of said object and the information on the character model on said receiving side.

15. A service for distributing or selling removable media including CD-ROM and DVD for holding a plurality of types of models for one object for said method of transmitting/receiving a broadcast according to claim 10.

16. A method of transmitting/receiving a broadcast comprising the steps of:

broadcast-transmitting information of a background image and a plurality of character models for an object on a transmitting side;

receiving the information of said broadcast-transmitted background image and the character models on a receiving side;

generating motion information for said object on the receiving side;

generating a character image for performing the motion from said character model using said generated motion information and said received character model information on the receiving side; and displaying said generated character image and said received background image on a same screen at the same time on the receiving side.

* * * * *